March 18, 1941.   I. S. ROBERTS   2,235,533
MEASURING CROSS SECTION OF PASSAGES
Filed Jan. 13, 1939
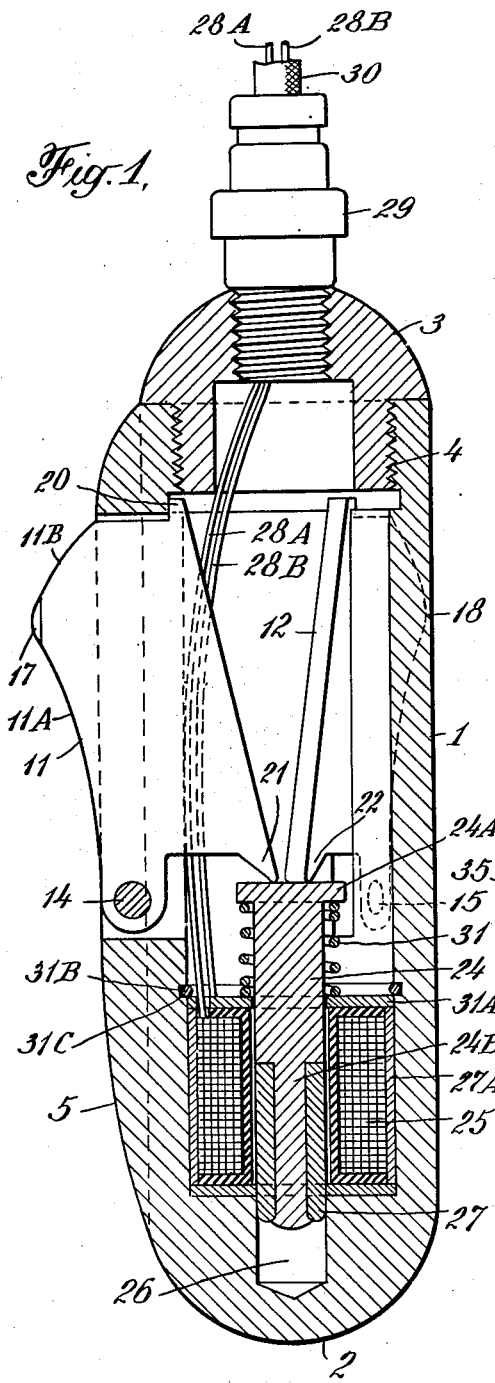
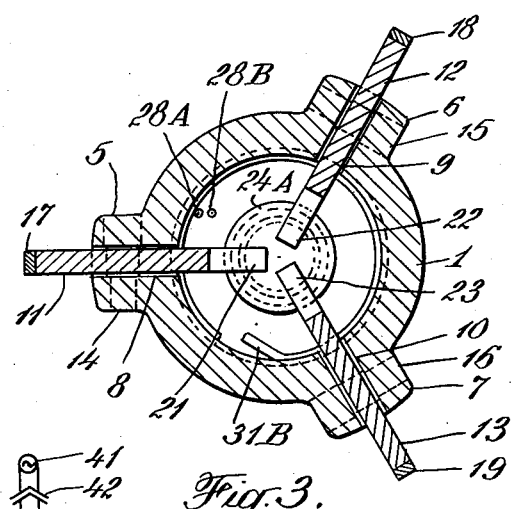
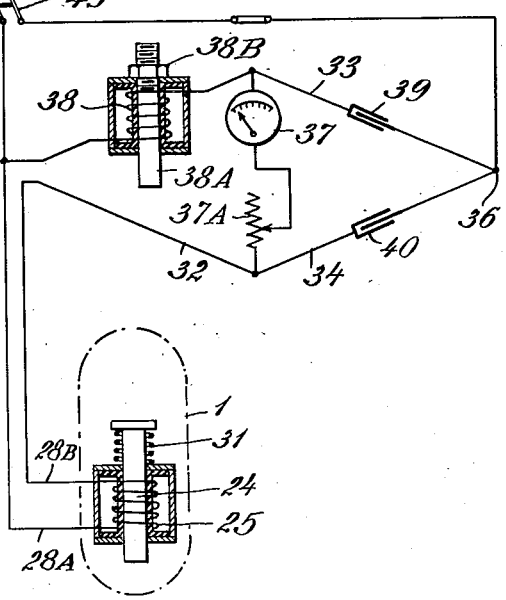
INVENTOR
Ingham S. Roberts
BY
ATTORNEYS Patented Mar. 18, 1941

2,235,533

UNITED STATES PATENT OFFICE 2,235,533

MEASURING CROSS SECTION OF PASSAGES

Ingham S. Roberts, Ridley Park, Pa.

Application January 13, 1939, Serial No. 250,763

7 Claims. (Cl. 33—178)

This invention relates to tube calipering and has for its principal object the provision of improved means for measuring internal cross-sectional dimensions of tubes and the like having relatively long and narrow interior passages. The invention provides apparatus adapted to be passed lengthwise of a tube to be calipered and which is of such nature that a continuous indication of the diameter or other transverse dimension of the passage being calipered is secured as the apparatus is passed lengthwise thereof.

The apparatus of the invention finds particular utility in indicating, determining or measuring variations in the transverse dimension of a relatively long narrow conduit that is difficult of access, such for example, as a boiler tube, and in its preferred form is capable of giving a continuous "profile" or chart of the transverse dimensions along a conduit. This is accomplished by means of a caliper finger movable with respect to a head to bear upon a wall of the conduit, and which (in moving) actuates an electrical means which indicates variations in the width of a longitudinal section of the conduit. Thus, my invention contemplates the combination, in such calipering apparatus, which comprises a head adapted to be moved lengthwise within the conduit, a caliper finger mounted on the head and movable with respect thereto into engagement with a wall of the conduit, an electrical circuit having a portion disposed in said head, means for varying an electrical characteristic of said portion in response to movement of the finger relative to the head, and an indicating means connected in said circuit (preferably remote from said portion so as to be disposed outside the conduit) for indicating the variations in said electrical characteristic. The circuit may be energized by either A. C. or D. C. current, and the electrical characteristic to be varied may be resistance in the case of D. C. current or impedance, (i. e., inductance, inductive reactance, capacitive reactance, or any combination thereof) in the case of A. C. current. Thus, the movement of the finger may be employed to shift a variable resistance in a D. C. circuit, but I prefer to employ impedance (and specifically inductive reactance) as the electrical characteristic of the circuit to be varied in response to variation in a cross-sectional dimension of the conduit. The variable impedance advantageously is connected electromagnetically to at least one caliper finger and electrically connected in a bridging circuit, this caliper finger being movable in a direction substantially radial with respect to a conduit being calipered, for example, a tube. As the head is passed lengthwise of the tube, the value of the variable impedance varies in response to movement of the movable caliper finger (or fingers) as the internal diameter of the tube varies and is measured by a suitable electric indicating means in the bridging circuit. The indicating means may be calibrated to give the tube diameter directly.

In a preferred form of my apparatus, adapted to measure tube diameters, three caliper fingers are mounted on the measuring head, at least one of the fingers being mounted in a manner to move radially into engagement with the inner surface of the tube wall. Means are provided for urging the movable finger into engagement with the inner surface of the tube wall with sufficient force to insure contact of all three fingers of the tube wall. A solenoid coil is mounted within the measuring head and a non-magnetic plunger carrying a magnetic core is mounted for movement within the solenoid coil along the axes of the coil. A projection on the movable finger engages with the plunger in such manner that movement of the finger actuates the plunger to move the magnetic core relative to the solenoid coil in approximate proportion to movement of the caliper finger. In this manner the inductance of the solenoid coil varies with movement of the movable caliper fingers. The solenoid coil is connected in a Wheatstone bridge circuit across a source of alternating potential. The bridge circuit includes an electrical indicating mechanism which operates in response to variations in the solenoid inductance and thus provides indication of the diameter of the tube being calipered.

Although my calipering apparatus may be provided with two fixed and one movable fingers or with three movable fingers, the former is particularly desirable for use in calipering horizontally positioned tubes and the latter for calipering vertically positioned tubes. The invention will be better understood from the following description considered in connection with the accompanying drawing, which illustrates a preferred form of the calipering apparatus having three movable fingers, and in which:

Fig. 1 is an elevation, partly in section, of the measuring head equipped with three movable fingers.

Fig. 2 is a plan view, in section, of the apparatus of Fig. 1; and

Fig. 3 is a wiring diagram showing how a solenoid in the measuring head of Fig. 1 is connected with the Wheatstone bridge circuit.

Referring now to the figures, the measuring head comprises a cylindrical shell 1 having domed end portions 2, 3. The lower end portion 2 of the shell is formed integrally therewith. The upper domed portion 3 is fastened to the shell by an interior threaded section 4. Running lengthwise of the shell on the outside thereof are three longitudinal protective bosses 5, 6, 7, which may be formed integrally with the shell or made of abrasion-resistant material and fastened thereto. The bosses are spaced from each other by about 120°. The shell and the end portions may be made of aluminum, brass, or other suitable metallic or non-metallic material.

Longitudinal slots 8, 9, 10, respectively, pass through the shell and the bosses at approximately the center of the latter and three fingers 11, 12, 13, are mounted respectively in the three slots by means of pins 14, 15, 16, positioned in the lower portion of the slots and passing through the lower portions of the fingers. The fingers project outwardly from the slots and carry bearing portions 17, 18, 19, respectively, which are adapted to engage the wall of the tube. (The bearing points may be made of "Stellite" or other material strongly resistant to abrasion, or may be fitted with a roller bearing or other means of minimizing wear.) Thus, the three movable fingers protrude radially through the slots in the shell to come in contact with the inside surface of the tube to be measured. The outwardly projecting portions of the pivoted fingers are shaped as at 11A and 11B to insure an inward thrust upon the fingers and to minimize resistance to the longitudinal motion of the measuring head when the fingers come in contact with any corner or protrusion at the entrance to or inside of the tube. The contour of shaped contact surfaces 11A and 11B extending from the bearing portions towards both ends of each finger is such as to present a substantially constant angle of approach with the exterior surface of the measuring head thus promoting maximum ease of introduction of the caliper into tubes of various diameters and of passing depressions or protrusions on the interior surface of the tubes to be calipered. At the upper end of each of the fingers there is a stop 20 which is adapted to bear upon the interior of the shell and limit the outward movement of the finger. The lower inner portions of the respective fingers have projections 21, 22, 23, which are adapted to bear upon the top of a movable plunger 24. This plunger is mounted coaxially of and is adapted to slide longitudinally within a solenoid coil 25 and into a hole 26 in the lower end portion of the shell. The plunger comprises a non-magnetic head 24A formed integrally with a non-magnetic shank portion 24B, the lower portion of which bears a sleeve 27 of magnetic material which serves as a variable core for the solenoid. The solenoid is disposed coaxially within the shell and is held in a fixed position relative to the shell by a spring retaining ring 31B which fits into a groove 31C in the internal surface of the shell. The solenoid may be sheathed in an iron or steel case 27A, which serves to direct the magnetic path, i. e., the position of the lines of force around the solenoid. The two ends of the solenoid coil are connected by insulated wire leads 28A, 28B through a connecting and clamping device 29 and a rubber-covered cable 30 to the electrical circuit shown in Fig. 3.

A helical spring 31 is disposed between the cap on the plunger and a plate 31A, which forms the top of a solenoid case 27A. This spring in operation is always partially compressed so that it maintains contact between the plunger and the projections of the pivoted fingers which rest thereon.

The shank and the magnetic sleeve of the plunger are so proportioned that the upper end of the magnetic sleeve or core always falls within the solenoid so that a relatively large change in the inductance of the solenoid will be obtained with a given change in the position of the fingers and so that the inductance of the solenoid will decrease as the fingers move inward.

The electrical circuit in which the solenoid of the measuring head is connected is essentially a Wheatstone bridge adapted to indicate quantitatively an unbalanced condition. It comprises a Wheatstone bridge 32, having an upper leg 33 and a lower leg 34 connected in parallel through extremities 35, 36. A voltmeter 37 is connected in series with a variable resistance 37A between the two legs of the bridge. The solenoid coil 25 of the measuring head is connected in the left-hand side of the lower leg of the bridge, and a second solenoid coil 38 identical with that of the measuring head is connected in the left-hand portion of the upper leg of the bridge. This second solenoid is provided with a plunger 38A similar in construction to that of the measuring head, except that it is provided with means, such as a screw 38B, for holding its magnetic core in a fixed relationship with respect to the second solenoid and thus producing a desired inductance. The right-hand sides of the upper and lower legs of the bridge each contain identical condensers 39, 40, for purposes of completing the bridge and fixing its impedance limits. A source of alternating current 41, for example, a 60 cycle A. C. 110 volt commercial power line, may be connected in series with the two extremities of the bridge, through a plug 42. A switch 43 for interrupting current when the plug is connected to the power line may also be provided for convenience.

The voltmeter preferably is of the high resistance type, and the variable resistance in series with it is for the purpose of compensating the caliper for variations in the voltage of the current supply by adjusting the range of the voltmeter.

Values of resistance 37A, inductances 25, 38, and capacitance 39, 40, in the circuit should be such as to provide solenoid coils and condensers of suitable physical dimensions and such as will give values of asymmetric potential that are relatively low and within the range of the meter. Moreover, the values should be so chosen that the coils will not be subject to undue heating. The following data give proper dimensions and values for a specific case and serve to illustrate the method of calculation to employ for any given instance:

(1) Data

| | | |
|---|---|---|
| Voltage of power supply | 100 to 125 volts | —$E$ |
| Frequency | 60 cycles | —$f$ |
| Length of coils | 3.175 cm. | —$l$ or $1$ |
| Outside diameter of coils | 3.556 cm. | —O. D. |
| Inside diameter of coils | 1.905 cm. | —I. D. |
| Mean radius of coils | 1.365 cm. | —$r$ |
| Area of core (1.905 cm. diameter) | 2.850 sq. cm. | |
| Percent iron in area of magnetic section of core | 45% | |
| Assumed permeability of magnetic section of core | 400 | $\mu$ $m$ |
| Maximum length of magnetic section of core | 2.222 cm. | |
| Minimum length of magnetic section of core | 1.587 cm. | |
| Maximum length of non-magnetic section of core | 1.587 cm. | |
| Minimum length of non-magnetic section of core | .952 cm. | |

(2) Objective

To select circuit values which will permit the use of a Triplet model 521, 1,000 ohms/volt, 0 to 10 volt range A. C. voltmeter and of standard condensers and which will not cause heating effects in the coils in excess of acceptable values.

(3) *Procedure*

(A) For trial, assume #27 gauge enameled copper wire for the coils. If this does not give satisfactory circuit values, try larger or smaller wire as indicated.

The area of half of the section of one of the coils equals:

$$l\frac{O.D.-I.D.}{2}=3.175\frac{3.556-1.905}{2}=2.619 \text{ sq. cm.}=.406 \text{ sq. in.}$$

and with #27 gauge wire there would be about 1700 turns in .406 sq. in. (Handbook value) or $N=1700$.

(B) Since it is desired to balance the bridge at zero asymmetric potential when the fingers of the measuring head are in a position corresponding to the minimum tube diameter which may be measured and therefore to the minimum inductance of the variable solenoid so that the voltmeter reading will increase as the tube diameter increases, the core of the adjustable solenoid is set so that it will have this same inductance which equals:

$$L_{min}=\frac{4\pi^2 N^2 r^2 \mu \text{ min.}}{10^9 l}$$

where $\mu$ min. is the effective permeability of the core of the adjustable solenoid and of the variable solenoid when it has its minimum length of magnetic section. The reluctance of the core of a solenoid 3.175 cm. long and having a magnetic core ($\mu=400$) 1.587 cm. long in series with a non-magnetic core ($\mu=1$) 1.587 cm. long, each being 2.850 sq. cm. in cross-section, equals:

$$\text{Reluctance}=\frac{1.587}{(2.850)(400)}+\frac{1.587}{(2.850)(1)}=.5582 \text{ oersteds}$$

and the effective permeability of the magnetic and non-magnetic sections in series then equals:

$$\mu \text{ min.}=\frac{3.175}{(2.850)(.5582)}=1.996$$

and the corresponding inductance equals:

$$L \text{ min.}=\frac{(4\pi^2)(1700)^2(1.365)^2(1.996)}{10^9(3.175)}=.1336 \text{ henries}$$

and the inductive reactance equals:

$$X_L \text{ min}=2\pi f L \text{ min}=(2\pi)(60)(.1336)=50.37 \text{ ohms}$$

(C) The reluctance of the core of the variable solenoid when it has its maximum length of magnetic section equals:

$$\text{Reluctance}=\frac{2.222}{(2.850)(400)}+\frac{.952}{(2.850)(1)}=.3359 \text{ oersteds}$$

and the effective permeability of the magnetic and non-magnetic sections in series then equals:

$$\mu \text{ max.}=\frac{3.175}{(2.850)(.3359)}=3.316$$

and the corresponding inductance equals:

$$L \text{ max.}=\frac{4\pi^2(1700)^2(1.365)^2(3.316)}{10^9(3.175)}=.2220 \text{ henries}$$

and the inductive reactance equals:

$$X_{Lmax}=2\pi f L \text{ max.}=(2)(60)(.2220)=83.69 \text{ ohms}$$

(D) At 57.2 ohms per 1000 feet for #27 gauge wire at 50° C. (Handbook value), the resistance of the coil equals:

$$R=\frac{(1.365)(2)(\pi)(1700)(57.2)}{(2.54)(12)(1000)}=27.50 \text{ ohms}$$

(E) The impedance of the adjustable solenoid and of the variable solenoid when it has its minimum inductance value equals:

$$Z_{xL \text{ min}}=\sqrt{R^2+X_{L \text{ min}}^2}=\sqrt{27.50^2+50.37^2}=57.39 \text{ ohms.}$$

and the impedance of the variable solenoid when it has its maximum inductance value equals:

$$Z_{XL \text{ max}}=\sqrt{R^2+X_{L \text{ max}}^2}=\sqrt{27.50^2+83.69^2}=88.09 \text{ ohms.}$$

(F) Since the minimum line voltage with which the instrument is to be used is 100 volts A. C. and since a zero to ten volts voltmeter is to be used across the bridge, the condensers must be chosen so that their capacity reactances, in combination with the calculated coil resistances and the calculated range in inductive reactances, will give current values at 100 volts potential drop lengthwise of the bridge which will, in turn, give asymmetric potentials across the bridge ranging between zero and ten volts. Line voltages in excess of 100 volts would give proportionally larger asymmetric potentials and resistance would be placed in series with the voltmeter to increase its range by the same proportion.

Calling the current through the variable solenoid $I_1$ and that through the adjustable solenoid $I_2$, the maximum asymmetric potential across the bridge or, in other words, the maximum difference between the potential drops across the variable and adjustable solenoids then equals:

$$E_{A \text{ max}}=(Z_{XL \text{ max}})(I_1)-(Z_{XL \text{ min}})(I_2)$$

In this equation:

$$I_1=\frac{E}{Z_{XL \text{ max}}C}$$

and $$I_2=\frac{E}{Z_{XL \text{ min}}C}$$

where $E$ is the line voltage and $Z_{XL \text{ min}}C$ is the impedance of the side of the bridge containing the adjustable solenoid and equals:

$$Z_{XL \text{ min}}C=\sqrt{R^2+(X_{L \text{ min}}-X_C)^2}=\sqrt{27.50^2+(50.37-X_C)^2}$$

and $Z_{XL \text{ max}} C$ is the impedance of the side of the bridge containing the variable solenoid when the inductance of this solenoid is a maximum and equals:

$$Z_{XL \text{ max}}C=\sqrt{R^2+(X_{L \text{ max}}-X_C)^2}=\sqrt{27.50^2+(83.69-X_C)^2}$$

where $X_c$ is the capacity reactance of each of the two identical condensers.

(G) The equation for the maximum asymmetric potential across the bridge now becomes:

$$E_{A \text{ max}}=\frac{(Z_{XL \text{ max}})(E)}{\sqrt{R^2+(X_{L \text{ max}}-X_C)^2}}-\frac{(Z_{XL \text{ min}})(E)}{\sqrt{R^2+(X_{L \text{ min}}-X_C)^2}}$$

or, after substituting given or calculated values and making the maximum asymmetric potential equal to ten volts as fixed by the range of the voltmeter:

$$E_{A \text{ max}}=\frac{(88.09)(100)}{\sqrt{27.50^2+(83.69-X_C)^2}}-\frac{(57.39)(100)}{\sqrt{27.50^2+(50.37-X_C)^2}}=10 \text{ volts}$$

where $X_C$ is now the capacity reactance necessary for each condenser in order to allow a maximum asymmetric potential of ten volts.

Solve for or find by trial a value of $X_C$ which will satisfy this equation, which gives: $X_C = 438.3$ ohms and since:

$$X_C = \frac{1}{2\pi f C}$$

$$C = \frac{1}{2\pi (60)(438.3)} = .000,006,0 \text{ farads} = 6.0 \text{ mfd.}$$

A condenser of 6.0 mfd. capacity is therefore required on each side of the bridge.

(H) The maximum current through the variable coil with these capacity values in the circuit is approximately 0.28 amp. or the maximum $I^2R$ heating effect equals approximately 2.2 watts which is satisfactory.

(I) Since we wish to use the instrument in connection with line voltages up to 125 volts or up to 25% in excess of that for which the circuit is designed, we must be able to increase the voltmeter range by 25% or by 2½ volts. At 1,000 ohms/volt, this will require an adjustable resistance of 2,500 ohms maximum value in series with the voltmeter.

(4) Results

Since the physical dimensions of the coils and condensers are satisfactory and since all other requirements are met, the calculated values are considered acceptable. To summarize:

Two coils of the given dimensions, each being wound with 1700 turns of #27 gauge enameled copper wire, with two condensers of 6.0 mfd. capacity each and a 0 to 10 volt A. C. 1000 ohm/volt voltmeter satisfy the requirements of the circuit of Fig. 3 when used in conjunction with the measuring head of Fig. 1 and with solenoid cores of the given dimensions and characteristics across a 100 volt A. C., 60 cycle power supply line. An adjustable resistance with a range of zero to 2,500 ohms, when connected in series with the voltmeter, may be used to compensate the instrument for use with line voltages between 100 and 125 volts. It is assumed that variations in line potential frequency will not be of sufficient magnitude to require compensation.

The operation of the apparatus is relatively simple. As the measuring head is pulled through a tube by means of the cable attached to its upper end portion, the fingers under the pressure of the spring will seek to touch the walls of the tube and will move in response to variations in the internal cross-section of the tube. Movement of the fingers will result in changing the position of the variable core within the solenoid in the measuring head, and this in turn will vary the inductive reactance of the solenoid and bring about a change in the voltmeter connected across the bridge circuit. The voltmeter, if of the recording type, will produce a continuous record of variations in internal cross-section of the tube encountered as the measuring head is moved therethrough. If desired, the voltmeter may be calibrated to read in terms of tube diameter.

Adjustment of the apparatus prior to use is also simple. It involves setting the inductance of the adjustable solenoid in the circuit equal to the inductance of the solenoid in the measuring head when the fingers of the measuring head are at their minimum inward position. With the apparatus thus set there will be an increase in asymmetric potential in the bridge circuit as the length of the magnetic core inside the solenoid of the measuring head is increased, and consequently an increased reading on the voltmeter as the fingers move outward when they encounter portions of the tube of greater cross-section.

For measuring tubes in other than a vertical position, the apparatus of Fig. 1 may be employed provided that the strength of the spring is such as to ensure that the measuring head is held in the approximate center of the tube. An alternative arrangement, which avoids the use of a very strong spring, is to employ only one movable finger (and two fixed fingers or their equivalent) which alone determines the position of the core in the solenoid of the measuring head. With such an apparatus, which is particularly suitable for use in horizontally disposed tubes, the measuring head is not necessarily centered in the tube. The measuring head is operated with the movable finger in contact with the upper portion of the tube to be calipered so that the movable finger does not carry any considerable component of the weight of the measuring head. This and other variations in design will occur readily to men skilled in the art without, however, departing from my inventive concepts.

The practice of this invention has several important advantages and eliminates a number of disadvantages of devices previously proposed for similar purposes. In use, the apparatus of the invention can be worked rapidly and thus permits the calipering of increased total lengths of tube in a given time, can be used to caliper in a single operation the entire length of the longest tube to be encountered in practical work, gives a continuous rather than a series of intermittent indications of the internal cross-sectional dimension of the tube, and can be worked conveniently since it imposes no unusual burden or effort upon the operator. The convenience and speed with which the apparatus of the invention can be worked in turn make possible important economies in reduction of the time required for such calipering. In some instances the time required can be so far reduced as to make it economically feasible and thus desirable to take the precaution of calipering at more frequent intervals. Several disadvantages of devices previously proposed for similar purposes which are eliminated by the apparatus of the invention may be mentioned. Such devices are frequently limited to indication of dimensions at a series of isolated points and thus may miss entirely some critical intermediate point or points. A number of such devices have been slow or inconvenient in working, because of heavy or clumsy construction, particularly when used in the calipering of long tubes. The measuring element of a number of such devices has necessarily been either too intricate or delicate to withstand rough treatment, elevated temperatures, abrasive dusts or similar conditions of practical operation. A number of such devices have been useful only for calipering tubes of limited maximum length. Some of the devices which have been proposed for these purposes have involved the joint use of several operating media, electricity and compressed air or one or both of these with some manual control for example, thus involving impractical complexities in either or both construction and operation. Some of these previously proposed devices have also included measuring elements useless in some applications because of the danger of an electric spark possibly incident to their use. The apparatus of the invention also has the advantage of unusual precision, particularly when the comparison is made in the higher range of working rates of which the apparatus of the invention is capable.

The apparatus of the invention is of special value and application in calipering, as a matter of inspection, the tubes of heating apparatus in which any reduction in the thickness of the wall of the tube is important, as a matter of safety for example, and is thus of special value and application in the inspection of tubes in oil heating furnaces as in oil distillation apparatus, oil cracking apparatus and the like.

I claim:

1. Tube calipering apparatus of the character described comprising a measuring head having caliper fingers mounted thereon and adapted for introduction into a tube to be calipered, at least one of said fingers being mounted to move independently of the other fingers in a direction substantially radial with respect to the tube to be calipered, a solenoid coil mounted in said measuring head, a core of magnetic material directly and operatively connected with said movable finger and adapted to longitudinal movement relative to said solenoid coil in response to movement of said movable finger, and means urging said movable finger into engagement with the inner wall of the tube to be calipered.

2. Tube calipering measuring head having three caliper fingers mounted thereon and adapted at substantially equal arcuate intervals for introduction into a tube to be calipered, at least one of said fingers being mounted to move independently of the other fingers in a direction substantially radial with respect to the tube to be calipered, a variable inductance mounted within said measuring head, said movable finger being in direct operative engagement with said variable inductance, and means urging said movable finger into engagement with the inner surface of the wall of the tube to be calipered with sufficient force to maintain all three caliper fingers in engagement with the tube wall.

3. Tube calipering apparatus of the character described comprising a measuring head having three caliper fingers mounted thereon at substantially equal arcuate intervals and adapted for introduction into a tube to be calipered, at least one of said fingers being pivotally mounted on said measuring head in a manner to be movable independently of the other fingers in a direction substantially radial with respect to the tube to be calipered, a solenoid coil mounted in said measuring head, a core of magnetic material mounted for longitudinal movement relative to said solenoid coil, a projection on said movable finger directly and engaging said core for moving the core in response to independent movement of the finger, and means for urging the movable finger into engagement with the tube wall with sufficient force to maintain all three caliper fingers in engagement with the tube wall.

4. Tube calipering apparatus of the character described comprising a generally cylindrical measuring head having three caliper fingers mounted thereon at substantially equal arcuate intervals and adapted for introduction into a tube to be calipered, at least one of said fingers being pivotally mounted in a slot in said measuring head and arranged for motion independently of the other fingers about its pivot in a direction radial with respect to the measuring head, a solenoid coil mounted within the measuring head, a non-magnetic plunger carrying a magnetic core adapted to longitudinal movement relative to said solenoid coil, a projection on said movable finger directly engaging said plunger for moving said core in response to movement of the finger, and means for urging the movable finger into engagement with the inner surface of the wall of the tube to be calipered with sufficient force to maintain all three caliper fingers in engagement with the tube wall.

5. Tube calipering apparatus of the character described comprising a generally cylindrical measuring head, three independent caliper fingers pivotally mounted in slots formed at substantially equally spaced intervals in the periphery of said head, a solenoid coil mounted in said head, a plunger carrying a magnetic core mounted for longitudinal movement relative to said coil, projections on said fingers independently and directly engaging said plunger in a manner to move said core relative to the solenoid coil in response to movement of any one of the fingers, and spring means urging said plunger against said projections with sufficient force to maintain all three fingers in engagement with the inner surface of the wall of the tube to be calipered.

6. Tube calipering apparatus of the character described comprising a generally cylindrical measuring head, three independent caliper fingers pivotally mounted in slots formed at substantially equally spaced intervals in the periphery of said head, a solenoid coil mounted in said head, a plunger carrying a magnetic core mounted for longitudinal movement relative to said coil, projections on said fingers independently and directly engaging said plunger in a manner to move said core relative to the solenoid coil in response to movement of any one of the fingers, and spring means urging said plunger against said projections with sufficient force to maintain all three fingers in engagement with the inner surface of the wall of the tube to be calipered, and means for limiting movement of the fingers about their pivot mountings.

7. Tube calipering measuring head having a plurality of caliper fingers mounted thereon and adapted at substantially equal arcuate intervals around the measuring head for introduction into a tube to be calipered, at least one of said fingers being mounted to move independently of the other fingers in a direction substantially radial with respect to the tube to be calipered and being provided with an external contour including a bearing portion for contact with the walls of the tube and contact surfaces extending from the bearing portion toward both ends of the finger adapted to present a substantially constant angle of approach with the exterior surface of the measuring head, a variable inductance mounted within said measuring head, said movable finger being in direct operative engagement with said variable inductance, and means urging said movable finger into engagement with the inner surface of the wall of the tube to be calipered with sufficient force to maintain all of the caliper fingers in engagement with the tube wall.

INGHAM S. ROBERTS.